(12) United States Patent
Klug et al.

(10) Patent No.: US 10,610,955 B2
(45) Date of Patent: Apr. 7, 2020

(54) SYSTEM AND METHOD FOR VENTING AIR IN A WELDING SYSTEM

(71) Applicant: A. O. SMITH CORPORATION, Milwaukee, WI (US)

(72) Inventors: James Klug, Johnson City, TN (US); Nathan Timbs, Johnson City, TN (US)

(73) Assignee: A. O. SMITH CORPORATION, Milwaukee, WI (US)

(*) Notice: Subject to any disclaimer, the term of this patent is extended or adjusted under 35 U.S.C. 154(b) by 428 days.

(21) Appl. No.: 15/491,787

(22) Filed: Apr. 19, 2017

(65) Prior Publication Data

US 2017/0304927 A1 Oct. 26, 2017

Related U.S. Application Data

(60) Provisional application No. 62/325,915, filed on Apr. 21, 2016.

(51) Int. Cl.
| | | |
|---|---|---|
| *B23K 9/12* | (2006.01) | |
| *B23K 31/02* | (2006.01) | |
| *B23K 11/06* | (2006.01) | |
| *B23K 11/30* | (2006.01) | |
| *B23K 37/02* | (2006.01) | |

(Continued)

(52) U.S. Cl.
CPC ........ *B23K 11/066* (2013.01); *B23K 11/3045* (2013.01); *B23K 31/027* (2013.01); *B23K 2101/04* (2018.08); *B23K 2101/06* (2018.08)

(58) Field of Classification Search
CPC ..... B23K 11/063; B23K 11/066; B23K 11/10; B23K 11/115; B23K 11/24; B23K 11/25; B23K 11/3018; B23K 11/3045; B23K 11/3054; B23K 11/315; B23K 11/36; B23K 31/027; B23K 2201/04; B23K 2101/04; B23K 2101/06
USPC ............... 219/86.31, 86.51, 89, 113, 121.11, 219/121.13, 121.17, 121.33, 136, 137.31, 219/137.62, 137.9, 61.7
See application file for complete search history.

(56) References Cited

U.S. PATENT DOCUMENTS 3,540,525 A * 11/1970 Bradshaw ................ F24F 11/00
165/249
4,081,365 A * 3/1978 White .................... C02F 3/1215
210/626

(Continued)

FOREIGN PATENT DOCUMENTS

| CN | 102441751 A | 5/2012 |
| DE | 2305529 A1 | 8/1974 |
| GB | 480127 A | 2/1938 |

OTHER PUBLICATIONS

Bell & Gossett, "A-310 Air Vents" <http://literature.puertoricosupplier.com/032/RE31834.pdf> webpage available at least as early as Feb. 21, 2016.

(Continued)

*Primary Examiner* — Hung D Nguyen
(74) *Attorney, Agent, or Firm* — Michael Best & Friedrich LLP

(57) ABSTRACT

A welding system including a welding electrode, a closed-loop cooling device, and a vent. The closed-loop cooling device is configured to cool the welding electrode. The closed-loop cooling device includes a pump and a water line. The vent is located along a path of the water line. The vent is configured to release air trapped within the water line.

13 Claims, 7 Drawing Sheets

(51) Int. Cl.
*B23K 101/04* (2006.01)
*B23K 101/06* (2006.01)

(56) References Cited

U.S. PATENT DOCUMENTS

| | | |
|---|---|---|
| 4,260,868 A | 4/1981 | Day |
| 4,485,289 A | 11/1984 | Schwartz |
| 4,650,152 A | 3/1987 | Doutt |
| 4,742,841 A | 5/1988 | Vonderhaar et al. |
| 4,788,407 A | 11/1988 | Flater |
| 5,258,599 A | 11/1993 | Moerke |
| 5,378,868 A | 1/1995 | Burkhardt et al. |
| 5,698,117 A | 12/1997 | Doutt |
| 5,719,367 A | 2/1998 | Young |
| 6,066,824 A | 5/2000 | Crawford et al. |
| 8,872,071 B2 | 10/2014 | Achtner et al. |
| 2007/0023163 A1* | 2/2007 | Kidwell .................. F25B 30/06 165/45 |
| 2012/0273469 A1* | 11/2012 | Barnes ................. B23K 11/002 219/84 |
| 2016/0016264 A1 | 1/2016 | Deley, Jr. et al. |

OTHER PUBLICATIONS

Tecna, "3664P-3664P7 with completely automatic SMART PLUS function," <http://www.tecna.net/index.php? option=com_content &view=article&id=172:item-3664&catid=42&Itemid=128&lang= en> webpage accessed Sep. 29, 2015.

\* cited by examiner

SYSTEM AND METHOD FOR VENTING AIR IN A WELDING SYSTEM

CROSS-REFERENCE TO RELATED APPLICATIONS

The present application is related to and claims benefit under 35 U.S.C. § 119(e) from U.S. Provisional Patent Application Ser. No. 62/325,915, filed Apr. 21, 2016, titled "SYSTEM AND METHOD FOR VENTING AIR IN A WELDING SYSTEM", the entire contents of which are incorporated herein by reference.

BACKGROUND

The application relates to welding systems or machine.

SUMMARY

Typically, welding system includes cooling systems, such as closed-loop cooling systems, to cool electrodes used in the welding process. During welding, for example, mash seam welding, water is pumped through welding electrodes to remove heat from the electrodes. The water heated by the electrodes is continuously moved through a closed-loop cooling system that lowers the water temperature before it is pumped back through the electrodes. Over time, the electrodes need to be replaced. Before removing/replacing the electrodes, air is pumped through the closed-loop cooling system to drain the cooling water. This conserves the water, but results in air remaining in the cooling system after new electrodes are installed. This air can cause damage to the cooling system.

The application solves these issues by, in one embodiment, providing a welding system including a welding electrode, a closed-loop cooling device configured to cool the welding electrode, the closed-loop cooling device including a pump and a water line, and a vent located along a path of the water line, the vent configured to release air trapped within the water line.

In another embodiment the application provides a method for cooling a welding system, the method includes providing a welding electrode, cooling, via a closed-loop cooling device, the welding electrode, and releasing, via a vent, air trapped within the water line. Wherein the closed loop cooling device includes a pump and a water line.

In another embodiment the application provides a closed-loop cooling device configured to cool a welding electrode of a welding system, the closed-loop cooling device includes a pump, a water line, and a vent located along a path of the water line. The vent is configured to release air trapped within the water line. The closed-loop cooling device also includes an electronic controller configured to cool the welding electrode by operating the pump and releasing air trapped within the water line by controlling the vent.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
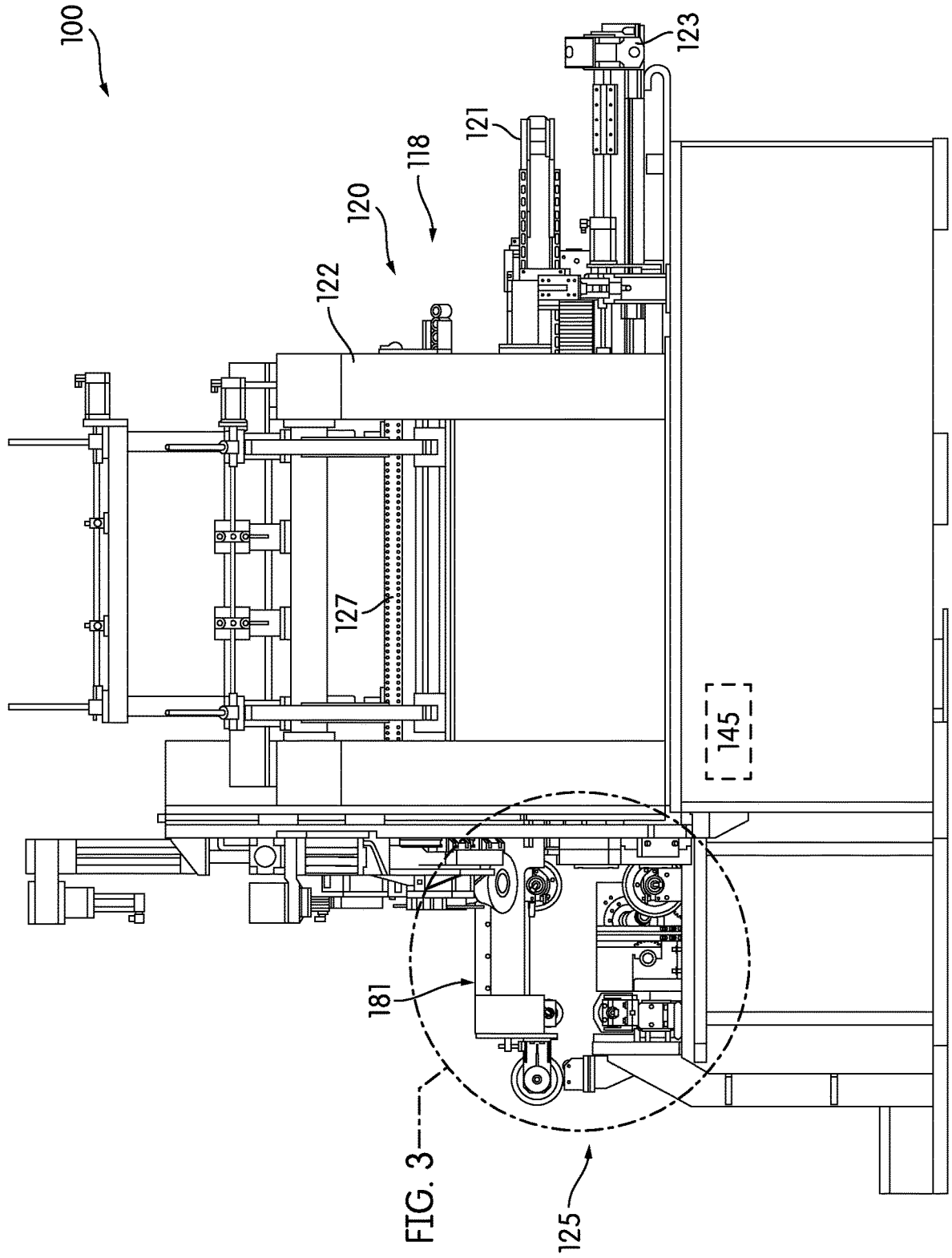
FIG. 1 is a front view of a welding system according to one embodiment.

FIG. 1 illustrates a front view of a welding system 100 in accordance with some embodiments of the invention. In some embodiments, the welding system 100 is configured to weld a work piece, or product, 105 (FIG. 6) having a first end 110 and a second end 115.

Figure 6:
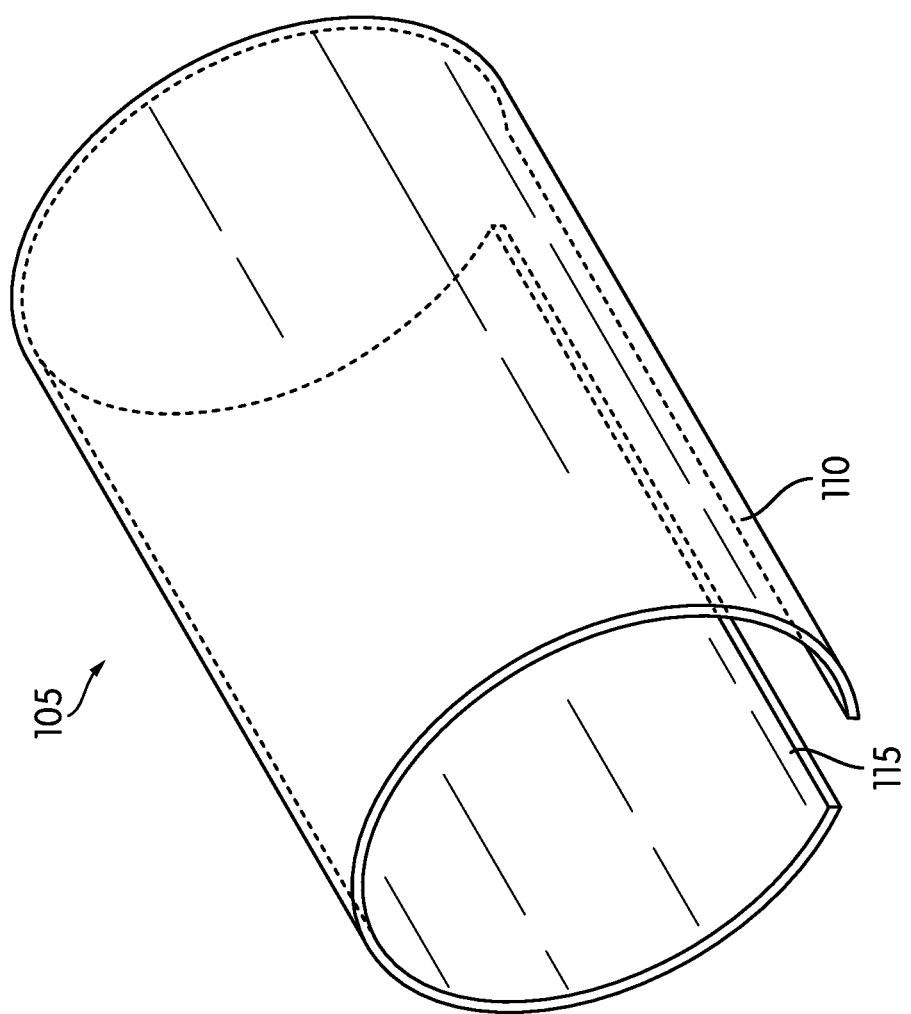
FIG. 6 is a schematic representation of a work piece for use in the welder of FIG. 1 according to one embodiment.

The welding system 100 includes a shaper 120 and a welder 125. The work piece 105 is first fed into the shaper 120 in a feed direction shown by an arrow 118. The shaper 120 includes a first guide 121, a frame 122, a pusher 123, a frame guide 127, and a plurality of feed rollers 130. The guide 121 includes a plurality of rollers disposed along a track. The guide 121 aligns the work piece 105 as the work piece 105 is pushed through the shaper 120 by the pusher 123. The frame 122 and the frame guide 127 help shape the work piece 105 into a predetermined shape. In some embodiments, the shaper 120 is configured to shape the work piece 105 into a substantially cylindrical shape (FIG. 6).

Figure 2:
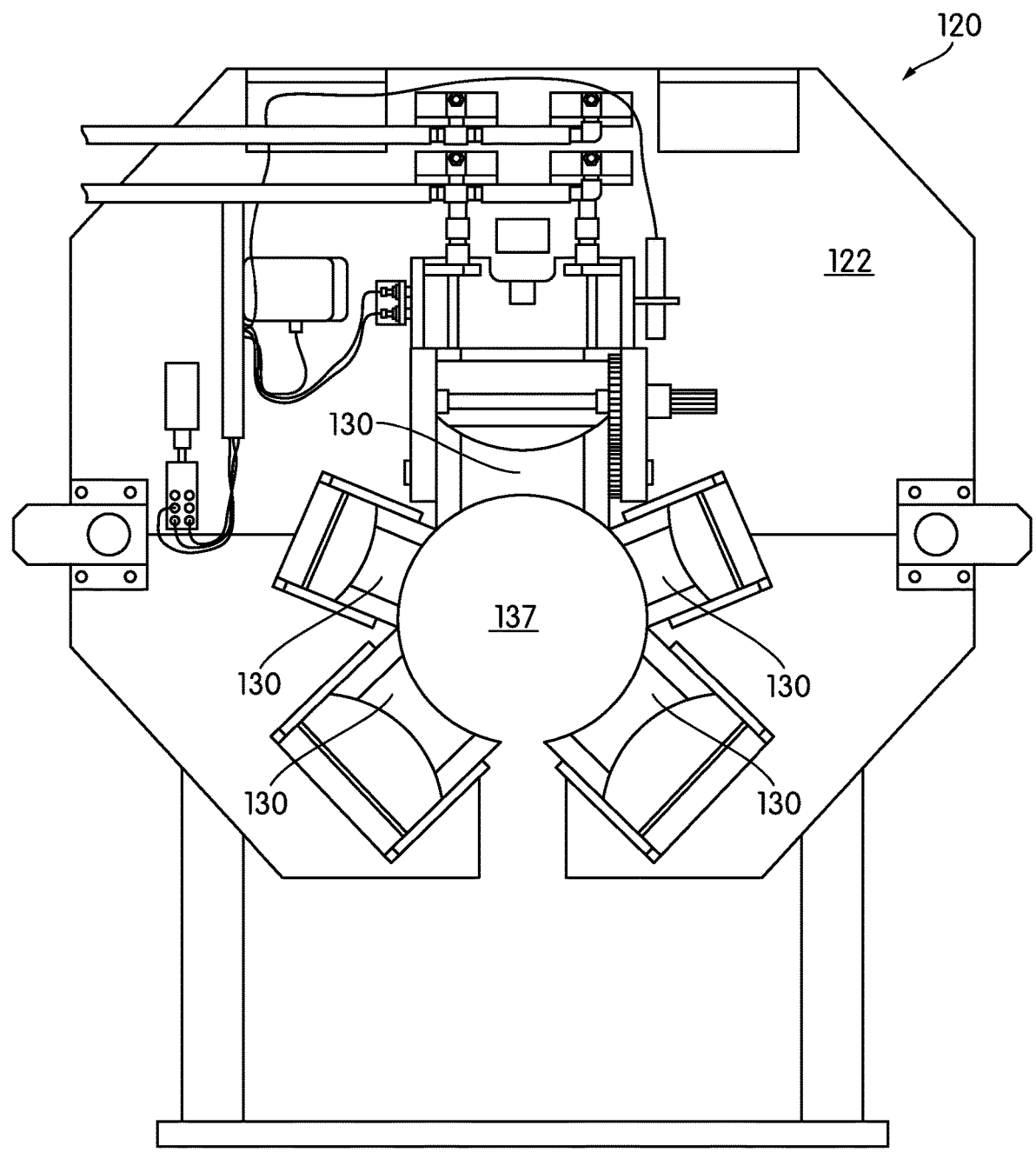
FIG. 2 is a front view of a shaper of the welding system of FIG. 1 according to one embodiment.

As shown in FIG. 2, the shaper 120 may include a plurality of feed rollers 130. In some embodiments, the feed rollers 130 have an hourglass shape. In the illustrated embodiment, the plurality of feed rollers 130 are arranged to form a passageway 137 having a substantially circular cross sectional shape. In such an embodiment, the plurality of feed rollers 130 are configured to receive the work piece 105 and feed the work piece 105 into the substantially cylindrical passageway 137 such that the first end 110 and the second end 115 of the work piece 105 slightly overlap. The feed rollers 130 provide a force on the outside edge of the unwelded work piece 105 to maintain the work piece 105 in a cylindrical shape as the work piece 105 is fed into the welder 125.

Figure 3:
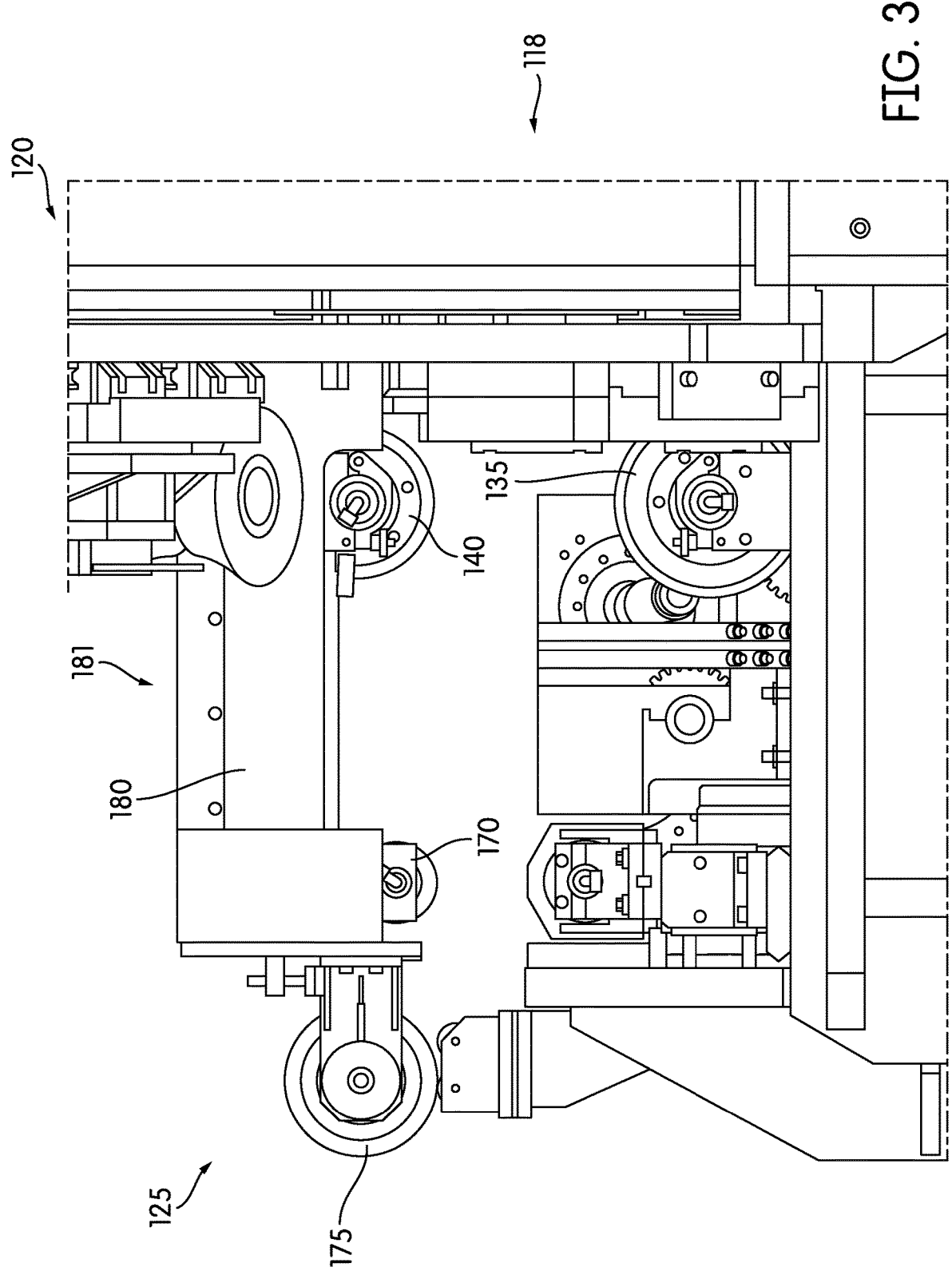
FIG. 3 is a detail view of a welder of the welding system of FIG. 1 according to one embodiment.
Figure 4:
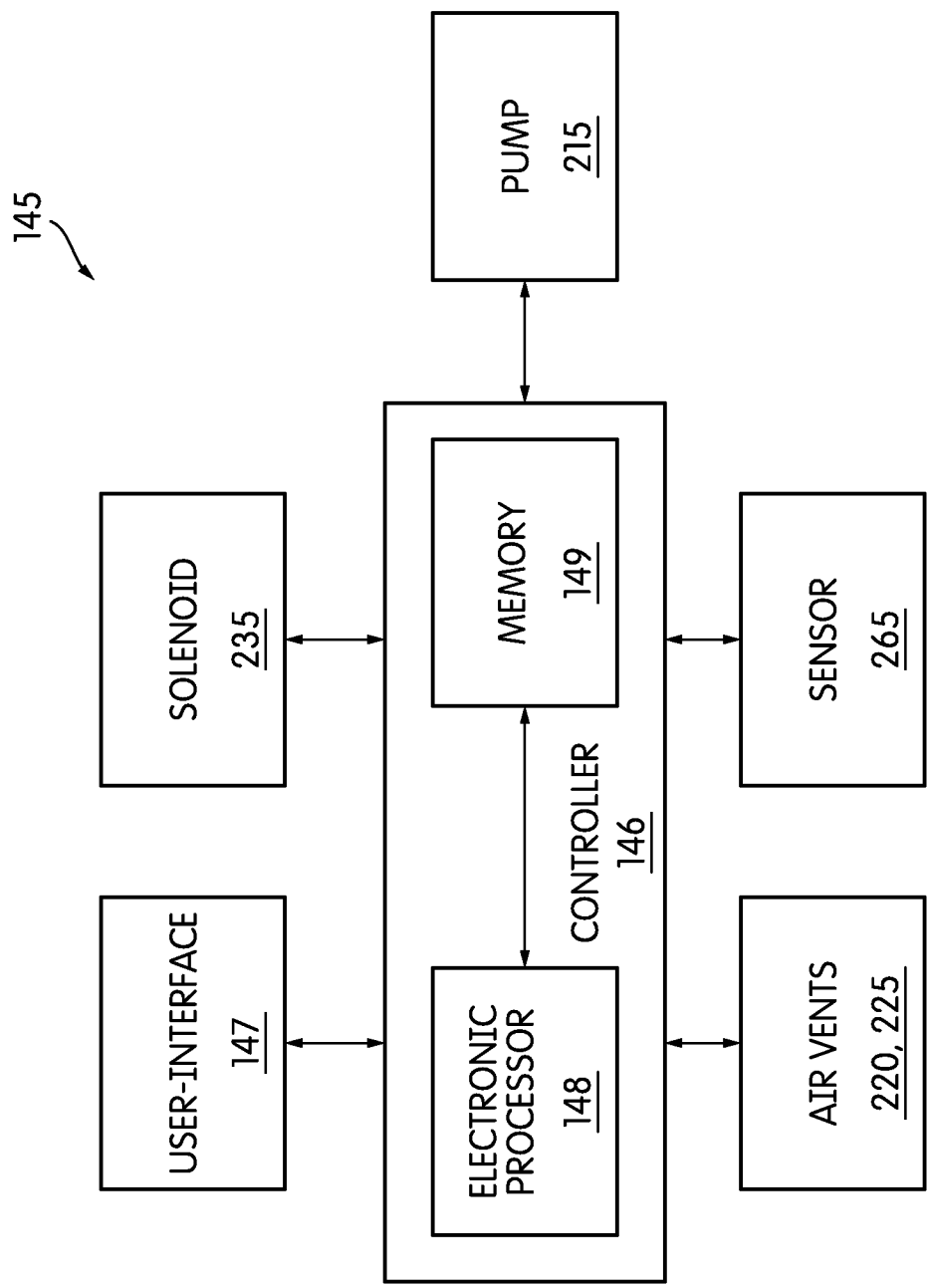
FIG. 4 is a block diagram of a control system of the welding system of FIG. 1 according to one embodiment.

FIG. 3 illustrates a side view of the welder 125 of the welding system 100. The welder 125 includes a first electrode 135, a second electrode 140, and a control system 145 (FIGS. 1 and 4).

In some embodiments, such as illustrated in FIGS. 1 and 3, the first and second welding electrodes 135, 140 are welding wheels. In other embodiments, the first and second welding electrodes 135, 140 are sticks, rings, or wires. The first welding electrode 135 and the second welding electrode 140 are positioned proximate the shaper 120. The first welding electrode 135 and the second welding electrode 140 are vertically stacked one above the other. The second welding electrode 140 is positioned on a welding horn 180. The second welding electrode 140 is moveable with respect to the welding horn 180 in the direction shown by an arrow 181 and in a direction opposite the direction shown by the arrow 181. In some embodiments, the welder 125 is positioned on the welding system 100 in a configuration that is substantially perpendicular to the embodiment shown in FIGS. 1 and 3. In such an embodiment, the welding horn 180 is movable in a direction substantially perpendicular to the direction shown by the arrow 181. In the illustrated construction, pneumatic cylinders (not shown) are used to move the second welding electrode 140. In some constructions, the second welding electrode 140 is pivotable to keep the second welding electrode 140 in the feed line. In other constructions, the second welding electrode 140 is fixed with respect to the welding horn 180 and the first welding electrode 135 is moveable into alignment with the feed direction. In such an embodiment, pneumatic cylinders are used to reposition the first welding electrode 135.

Although the embodiment of the welding system 100 discussed above includes two welding electrodes 135, 140, alternate embodiments may have more or less welding electrodes.

Once the work piece 105 is fed into the welder 125, the control system 145 commands the second welding electrode 140 to move in the direction shown by the arrow 181 until it is proximate the work piece 105 and the first welding electrode 135 and second welding electrode 140 are positioned on opposite sides of the overlapping first 110 and second 115 ends of the work piece 105. The control system 145 then commands a variable voltage source to supply a voltage across the first welding electrode 135 and the second welding electrode 140 as the work piece 105 is fed through the welder 125. In some embodiments, the speed that the work piece 105 is fed is variable and determined by the control system 145. The first welding electrode 135 and the second welding electrode 140 weld the overlapping first end 110 of the work piece 105 to the second end 115 of the work piece 105, forming a seam.

FIG. 4 illustrates a block diagram of the control system 145. The control system 145 is configured to communicatively couple to various components of the welding system 100 and may provide control and/or monitoring aspects of the welding system 100. The control system 145 may include a controller 146 and a user-interface 147. According to one or more exemplary embodiments, controller 146 includes a plurality of electrical and electronic components that provide power, operational control, and protection to the components and modules within the controller 146. For example, the controller 146 includes, among other things, an electronic processor 148 (e.g., a microprocessor, a microcontroller, or another suitable programmable device), a memory 149, and various input units and output units. In some embodiments, the controller 146 is implemented partially or entirely on a semiconductor (e.g., a field-programmable gate array ["FPGA"] semiconductor) chip, such as a chip developed through a register transfer level ("RTL") design process.

The memory 149 includes, for example, a program storage area and a data storage area. The program storage area and the data storage area can include combinations of different types of memory 149, such as read-only memory 149 ("ROM"), random access memory 149 ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 148 is connected to the memory 149 and executes software instructions that are capable of being stored in a RAM of the memory (e.g., during execution), a ROM of the memory (e.g., on a generally permanent basis), or another non-transitory computer readable medium such as another memory or a disc. Software included in the implementation of the cooling apparatus 200 can be stored in the memory 149 of the controller 146. The software includes, for example, firmware, one or more applications, program data, filters, rules, one or more program modules, and other executable instructions. The controller 146 is configured to retrieve from memory 149 and execute, among other things, instructions related to the control processes and methods described herein. In other constructions, the controller 146 includes additional, fewer, or different components.

The user-interface 147 is used to control or monitor the welding system 100. The user-interface 147 includes a combination of digital and analog input or output devices required to achieve a desired level of control and monitoring for the welding system 100. For example, the user-interface 147 includes a display (e.g., a primary display, a secondary display, etc.) and input devices such as touch-screen displays, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. The user-interface 147 can also be configured to display conditions or data associated with the welding system 100 in real-time or substantially real-time. For example, the user-interface 147 is configured to display measured electrical characteristics of the welding system 100 and the status of the welding system 100. In some implementations, the user-interface 147 is controlled in conjunction with the one or more indicators (e.g., LEDs, speakers, etc.) to provide visual or auditory indications of the status or conditions of the welding system 100. In the illustrated embodiment, the control system 145 is further communicatively coupled to a pump 215, a solenoid 235, and a sensor 265, discussed in more detail below.

Figure 5:
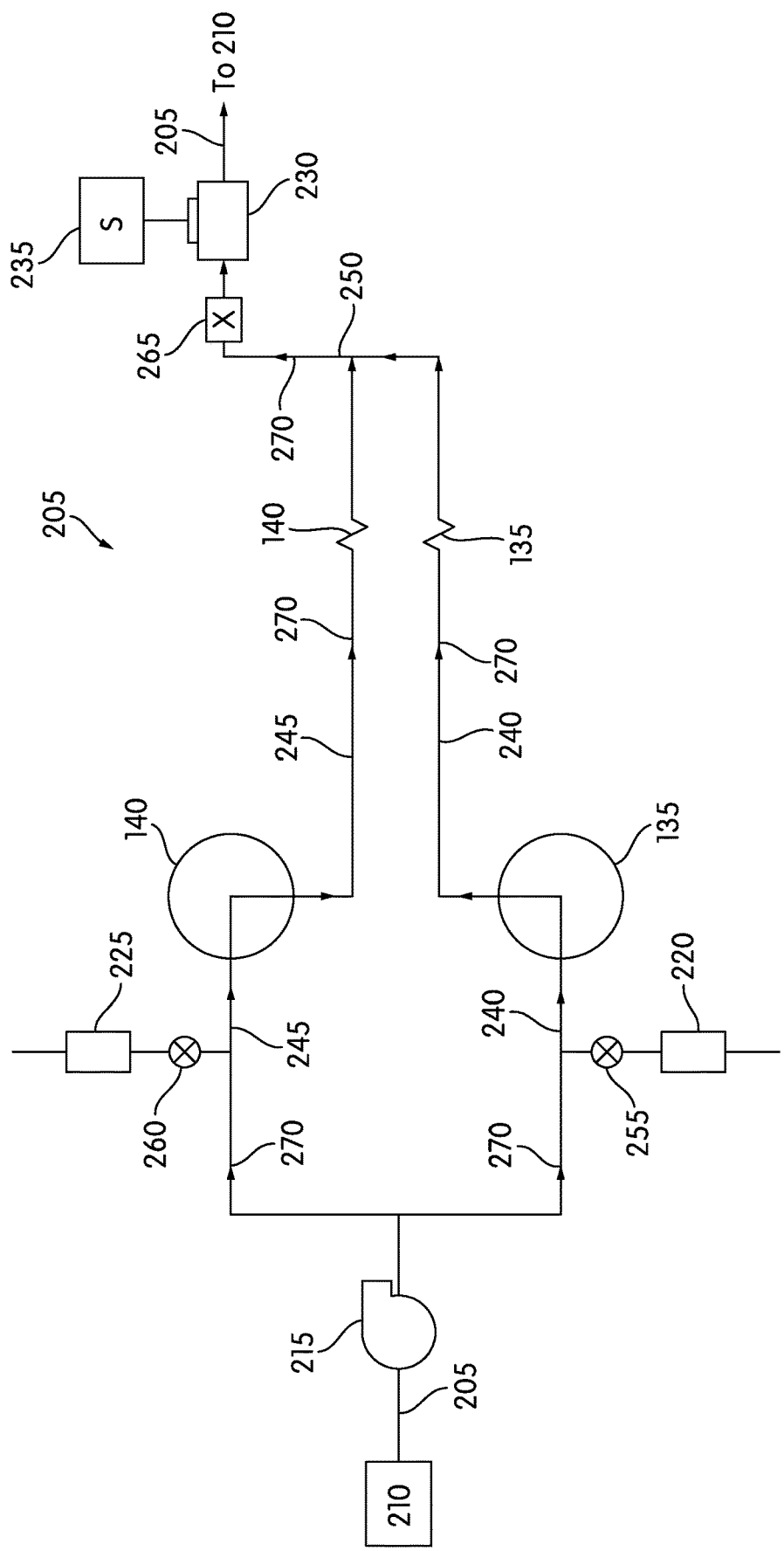
FIG. 5 is a schematic representation of a cooling system of the welding system of FIG. 1 according to one embodiment.

As shown in FIG. 5, the cooling apparatus 200 includes a water line network 205, a reservoir 210, the pump 215, a first compressed air input 220, a second compressed air input 225, a vent 230, the solenoid 235, and the sensor 265. The water line network 205 includes a first water line 240, a second water line 245, and a return water line 250. The water first line 240 extends through the first welding electrode 135. The second water line 245 extends through the second welding electrode 140. The first water line 240 and the second water line 245 are fluidly engaged with the return water line 250 downstream of the welding electrodes 135, 140. The return water line 250 directs water flow back into the reservoir 210. The pump 215 is positioned proximate to and in fluid communication with the reservoir 210. The first compressed air input 220 is positioned proximate the first electrode 135. A first check valve 255 is positioned between the first compressed air input 220 and the first water line 240. The second compressed air input 225 is positioned between the second water line 245 and the second electrode 140. A second check valve 260 is positioned between the second compressed air input 225 and the second water line 245. The first and second check valves 255, 260 are configured to prevent water that is flowing through the first water line 240 and second water line 245 from entering the first and second compressed air inputs 220, 225. The vent 230 is positioned proximate the return line 250. The sensor 265 is positioned proximate the vent 230. In some embodiments, the sensor 265 is a pressure sensor. The sensor 265 is configured to sense water flow through the return line 250 and send a signal to the control system 145 (FIG. 1) in response to sensed water flow. In some embodiments, the control system 145 controls the shaper 120 and the welder 125 and while a second control system may control the cooling apparatus 200.

In operation, the pump 215 causes water in the cooling apparatus 200 to flow from the reservoir 210 to the first water line 240 and the second water line 245. As shown by arrows 270, the first water line 240 and the second water line 245 direct cold water to the first welding electrode 135 and the second welding electrode 140, respectively. As the cold water flows through the first and second welding electrodes 135, 140, heat is transferred from the welding electrodes 135, 140 to the water, thus cooling the welding electrodes 135, 140. Downstream of the welding electrodes 135, 140, the first water line 240 and the second water line 245 are combined into the return water line 250. The return water line 250 returns the hot water to the reservoir 210, where the hot water can be cooled to an appropriate temperature and once again be used to cool the welding electrodes 135, 140.

Figure 7:
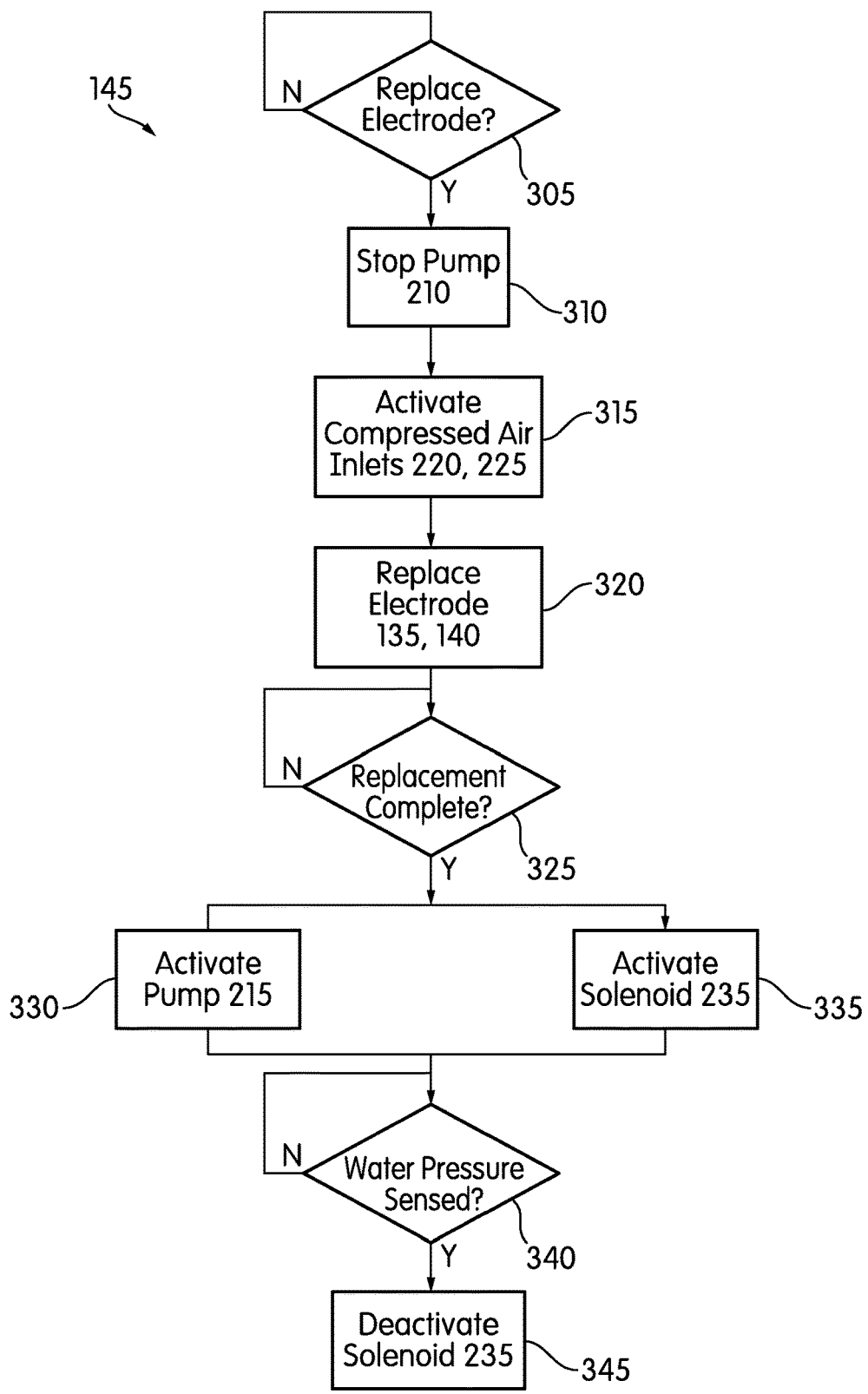
FIG. 7 is a flow chart that illustrates a process of changing a welding electrode used in the welding system of FIG. 1 according to one embodiment.

FIG. 7 illustrates a flow chart of a process 300 for replacing the first welding electrode 135 and/or the second welding electrode 140. Initially, the control system 145 determines if an electrode (e.g., the first welding electrode 135 or the second welding electrode 140) needs replacing (step 305). When neither electrode 135, 140 needs replacing, the process 300 cycles back to step 305. When at least one electrode 135, 140 does needs replacing, the control system 145 turns the pump 215 off, stopping water flow through the cooling apparatus 200 (step 310). Next, the control system 145 commands the compressed air inputs 220, 225 to introduce compressed air to the first water line 240 and the second water line 245 of the cooling apparatus 200 (step 315). In some embodiments, the air is introduced to the first and second water lines 240, 245 for a predetermined period of time. The compressed air pushes the water in the first water line 240, the second water line 245, and the return water line 250 into the reservoir 210 of the cooling apparatus 200 (step 320). After the water is removed from the water lines 240, 245, 250, the first welding electrode 135 or the second welding electrode 140 is removed and replaced with a new welding electrode 135, 140 (step 325). In other embodiments, the first welding electrode 135 or the second welding electrode 140 are removed and repaired.

With continued reference to FIG. 7, the control system 145 determines whether the electrode replacement is complete (step 325). In some embodiments, the control system 145 determines whether the electrode replacement is complete by receiving a command, via the user-interface 147, from the user. When the electrode replacement is not complete, the process 300 cycles back to step 325. When the electrode replacement is complete, the control system 145 powers the pump 215, causing water to flow through the cooling apparatus 200 (step 330). Simultaneously, the control system 145 commands the solenoid 235 to open the vent 230 (step 335). Water flow pushes the air inside of the water lines 240, 245, 250 through the vent 230, thus removing the air from the cooling apparatus 200. When the water flowing through the return water line 250 passes the sensor 265, the sensor 265 sends a signal to the control system 145 (step 340). In response, the control system 145 commands the solenoid 235 to close the vent 230 (step 345).

Thus, the application provides, among other things, a system for venting air from a closed loop cooling system and a method for using the same. Various features and advantages of the invention are set forth in the following claims.

What is claimed is:

1. A welding system comprising:
a welding electrode;
a closed-loop cooling device configured to cool the welding electrode, the closed-loop cooling device including a pump and a water line;
a vent located along a path of the water line, the vent configured to release air trapped within the water line;
a compressed air inlet;
an electronic processor configured to:
detect that the welding electrode is to be removed,
introduce, via the compressed air inlet, compressed air into the closed-loop cooling device, displacing water proximate the welding electrode,
power, in response to the welding electrode being replaced, the pump, causing the water to flow through the water line,
detect, via a sensor, the water flowing through the water line, and
close the vent in response to detecting the water flowing.

2. The welding system of claim 1, wherein the vent is controlled by a solenoid.

3. The welding system of claim 1, further comprising a second welding electrode, wherein the closed-loop cooling device is configured to cool the welding electrode and the second welding electrode.

4. The welding system of claim 1, wherein the welding system is configured to weld a product having a substantially cylindrical shape.

5. The welding system of claim 1, wherein the welding electrode includes a welding wheel.

6. The welding system of claim 1, wherein the vent removes the compressed air introduced by the compressed air input.

7. The welding system of claim 1, further comprising a check valve positioned between the compressed air input and the water line.

8. A method for cooling a welding system, the method comprising:
providing a welding electrode;
cooling, via a closed-loop cooling device including a pump and a water line, the welding electrode, wherein the closed loop cooling device includes a pump and a water line;
releasing, via a vent, air trapped within the water line;
introducing, via a compressed air inlet, compressed air into the closed-loop cooling device, displacing water proximate the welding electrode,
powering, in response to the welding electrode being replaced, the pump, causing the water to flow through the water line,
detecting, via a sensor, the water flowing through the water line, and
closing the vent in response to detecting the water flowing.

9. The method of claim 8, wherein the welding system includes a solenoid and the steps of releasing, via the vent, the air trapped within the water line and closing the vent include controlling the vent via the solenoid.

10. The method of claim 8, wherein the welding system includes a second welding electrode and the step of cooling the welding electrode further includes cooling the second welding electrode.

11. A closed-loop cooling device configured to cool a welding electrode of a welding system, the device including:
a pump;

a water line;

a vent located along a path of the water line, the vent configured to release air trapped within the water line; and an electronic controller configured to
- detect that the welding electrode is to be removed,
- introduce, via the compressed air inlet, compressed air into the closed-loop cooling device, displacing water proximate the welding electrode,
- power, in response to the welding electrode being replaced, the pump, causing the water to flow through the water line,
- detect, via a sensor, the water flowing through the water line, and
- close the vent in response to detecting the water flowing.

12. The closed-loop cooling device of claim 11, wherein the electronic processor controls the vent via a solenoid.

13. The closed-loop cooling device of claim 11, wherein the electronic controller is further configured to cool the welding electrode and a second welding electrode.

\* \* \* \* \*